US010405187B2

(12) United States Patent
Williams et al.

(10) Patent No.: US 10,405,187 B2
(45) Date of Patent: Sep. 3, 2019

(54) RECEIVING DEVICE, METHOD AND COMPUTER PROGRAM

(71) Applicants: SONY CORPORATION, Tokyo (JP); SONY EUROPE LIMITED, Surrey (GB)

(72) Inventors: David Rowland Williams, Cardiff (GB); Stephen Beck, Hook (GB); John Nicholas Wilson, Hook (GB); Gholam Hosein Asjadi, Guildford (GB)

(73) Assignees: Sony Corporation, Tokyo (JP); Sony Europe Limited, Surrey (GB)

( * ) Notice: Subject to any disclaimer, the term of this patent is extended or adjusted under 35 U.S.C. 154(b) by 0 days.

(21) Appl. No.: 14/758,729

(22) PCT Filed: Dec. 19, 2013

(86) PCT No.: PCT/GB2013/053358
§ 371 (c)(1),
(2) Date: Jun. 30, 2015

(87) PCT Pub. No.: WO2014/106734
PCT Pub. Date: Jul. 10, 2014

(65) Prior Publication Data
US 2015/0341796 A1 Nov. 26, 2015

(30) Foreign Application Priority Data
Jan. 7, 2013 (GB) .................................. 1300199.5

(51) Int. Cl.
*H04H 20/06* (2008.01)
*H04H 20/61* (2008.01)
(Continued)

(52) U.S. Cl.
CPC ............ *H04W 16/14* (2013.01); *H04H 20/06* (2013.01); *H04H 20/61* (2013.01); *H04H 60/51* (2013.01);
(Continued)

(58) Field of Classification Search
CPC ............... H04H 60/51; H04N 21/4383; H04N 21/4524; H04N 21/6125
See application file for complete search history.

(56) References Cited

U.S. PATENT DOCUMENTS 6,741,834 B1    5/2004 Godwin
7,478,069 B1 *  1/2009 Ritter ................. G06Q 20/3674
                                                                705/34
(Continued)

FOREIGN PATENT DOCUMENTS

CN    101558643      10/2009
EP    2 146 452 A2   1/2010
(Continued)

OTHER PUBLICATIONS

U.S. Appl. No. 13/638,824, filed Dec. 18, 2012, 2013/0090125 A1, John Christopher Clifton, et al.
(Continued)

*Primary Examiner* — Kunal Langhnoja
(74) *Attorney, Agent, or Firm* — Oblon, McClelland, Maier & Neustadt, L.L.P.

(57) ABSTRACT

A receiver receiving data includes: a first receiver configured to receive data in a first frequency band; a second receiver configured to receive second data in a second frequency band, the second frequency band being a subset of the first frequency band; and a data selector configured to select the frequency of operation of the second receiver from within
(Continued)

the second frequency band in accordance with information representing the physical geographical location of the receiving device.

31 Claims, 10 Drawing Sheets

(51) Int. Cl.
| | |
|---|---|
| *H04H 60/51* | (2008.01) |
| *H04N 21/45* | (2011.01) |
| *H04N 21/61* | (2011.01) |
| *H04W 16/14* | (2009.01) |
| *H04W 64/00* | (2009.01) |
| *H04N 21/418* | (2011.01) |
| *H04N 21/426* | (2011.01) |
| *H04N 21/438* | (2011.01) |

(52) U.S. Cl.
CPC ... *H04N 21/4181* (2013.01); *H04N 21/42607* (2013.01); *H04N 21/4383* (2013.01); *H04N 21/4524* (2013.01); *H04N 21/6125* (2013.01); *H04W 64/00* (2013.01)

(56) References Cited

U.S. PATENT DOCUMENTS

| | | | |
|---|---|---|---|
| 2002/0104099 A1* | 8/2002 | Novak | H04N 7/17318 725/136 |
| 2003/0107675 A1* | 6/2003 | Dew | H04N 5/44513 348/553 |
| 2004/0172647 A1 | 9/2004 | Godwin | |
| 2008/0127290 A1 | 5/2008 | Delegue et al. | |
| 2009/0253415 A1 | 10/2009 | Walker et al. | |
| 2011/0078734 A1* | 3/2011 | Lee | H04N 21/4312 725/39 |
| 2011/0283304 A1* | 11/2011 | Roberts | H04H 60/46 725/9 |
| 2012/0275354 A1 | 11/2012 | Villain | |
| 2013/0076987 A1 | 3/2013 | Wilson et al. | |
| 2013/0090125 A1 | 4/2013 | Clifton et al. | |
| 2013/0276049 A1* | 10/2013 | Yamagishi | H04N 21/2385 725/116 |
| 2013/0311669 A1 | 11/2013 | Reimers et al. | |

FOREIGN PATENT DOCUMENTS

| | | | |
|---|---|---|---|
| EP | 2 521 392 A1 | 11/2012 | |
| JP | WO 2012098950 A1 * | 7/2012 | ......... H04N 21/2385 |
| WO | WO 2012/097341 A1 | 7/2012 | |
| WO | WO 2012/098950 | 7/2012 | |
| WO | WO 2012/125631 A1 | 9/2012 | |
| WO | WO 2012/138800 A1 | 10/2012 | |

OTHER PUBLICATIONS

U.S. Appl. No. 13/636,538, filed Nov. 27, 2012, 2013/0076987 A1, John Nicholas Wilson, et al.
U.S. Appl. No. 13/856,794, filed Apr. 4, 2013, 2013/0311669 A1, Ulrich Reimers, et al.
International Search Report dated Feb. 19, 2014, in PCT/GB2013/053358, filed Dec. 19, 2013.
Great Britain Search Report dated Jul. 3, 2013, in Patent Application No. GB 1300199.5, filed Jan. 7, 2013.
Great Britain Search Report dated Mar. 7, 2014, in Patent Application No. GB 1300199.5, filed Jan. 7, 2013.
Chinese Office Action dated Dec. 26, 2016 (English Translation) for application 2013800696149 (7 pages).

* cited by examiner

| Frequency | Time | Description |
|---|---|---|
| Channel 25 | 16:30:30 - 18:43:30 | Local News /605 |
| | 18:43:31 - 22:53:23 | Data Channel /610 |
| Channel 26 | 16:27:30 - 19:00:00 | Weather Report /615 |
| | 19:00:01 - 23:00:00 | Local Radio \620 |

625 — Frequency; 630 — Time; 635 — Description; 600

FIG. 6

RECEIVING DEVICE, METHOD AND COMPUTER PROGRAM

BACKGROUND

Field of the Disclosure

The present invention relates to a receiving device, method and computer program.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

In television broadcasting, television programs may be transmitted in any one of a large number of broadcast channels. In the United Kingdom, for example, terrestrial television transport streams are transmitted in any of channels 21-60 in the Ultra High Frequency (UHF) band, 470-790 Mhz. However, as each transmitter broadcasts television program transport streams to a local area, the RF channels upon which television program transport streams are broadcast needs to be managed carefully. In order to reduce the interference which might be caused by receiving a signal from another transmitter on the same frequency in the network, each transmitter uses different frequency channels to broadcast. This means that in any one location there are sections of the UHF frequency band that are un-used. These un-used sections of the UHF frequency band are called "White Space".

Recently, there is a desire to use the "White Space". However, these discussions relate to devices that can transmit and receive data in the White Space, possibly within a single device acting as a transceiver, transmitting and receiving data in the same signal format bi-directionally. These conceptual devices can in some cases be expensive to produce and very complex. There is a requirement to use the White Space with lower cost, less complexity and with only unidirectional data handling. It is an aim of the present disclosure to address this, however, the ideas and techniques presented herein can equally be used to compliment a White Space bidirectional system.

SUMMARY

According to a first aspect, there is provided a receiving device for receiving data, the receiver comprising: a first receiver configured to receive data in a first frequency band; a second receiver configured to receive second data in a second frequency band, the second frequency band being a subset of the first frequency band; and a data selector configured to select the frequency of operation of the second receiver from within the second frequency band in accordance with information representing the physical geographical location of the receiving device.

The receiving device may further comprise: a memory configured to store a database comprising a plurality of time segments in association with each of a plurality of second frequency bands, wherein the selector is configured to select the frequency of operation of the second receiver during one of the plurality of time segments.

The receiving device may comprise an electronic program guide creator configured to display to a user an electronic program guide created using the stored plurality of time segments and second frequency bands; and in response to a user input, the selector is configured to select the frequency of operation of the second receiver during a user selected one of the plurality of time segments.

The receiving device may comprise a geographical positioning device configured to receive positioning information identifying the physical geographical location of the receiving device using either the Global Positioning System, wireless network information or user input physical location information.

The first data may contain information associating the frequency of operation of the second receiver with said physical geographical location of the receiving device.

The device may comprise a network interface configured to connect to a network and to receive the database over the network.

The second receiver may be configured to be in stand-by mode and to wake and receive the second data during the selected time segment.

The first receiver may be configured to be in stand-by mode and to wake to receive the database either at a predetermined time or in response to a wake-up signal received at the first receiver.

The network interface may be configured to be in stand-by mode and to wake to receive the database either at a predetermined time or in response to a wake-up signal received at the first receiver.

The database may be provided over social media in a predetermined format.

The first receiver may be configured to receive television signals according to a digital video broadcast protocol and the database is provided within broadcast Service Information within the television signals.

The network interface may be connectable to a telephony network or a local area network or a wide area network.

The receiving device may further comprise a device connector connectable to an apparatus external to the receiving device, the selector being configured to select the device connector and the device connector being configured to transfer to the external device the second data received by the second receiving device.

The receiving device may further comprise a decrypting device, wherein the received second data is encrypted and the decrypting device is configured to decrypt the encrypted second data using a decryption key.

The decryption key may be provided in accordance with a user input passcode or in accordance with a conditional access card.

According to another aspect, there is provided a receiving device for receiving data comprising: a receiver configured to receive and recover data from signals delivered in different frequency bands across a predetermined frequency bandwidth; and an interface configured to receive delivery information indicating the frequency bands in which the data is delivered, the delivery information further indicating timing information identifying the time at which the data is to be delivered and protocol information indicating the protocol used to deliver the data; wherein the receiver is configured to recover the data from the frequency band indicated by the delivery information in accordance with the timing information and the protocol information.

The interface may be configured to receive usage information, wherein the usage information indicates routing information identifying whether the data is to be stored, displayed to the user, delivered to a device external to the receiving device or whether the data is subject to content protection.

The receiver may be configured to receive and recover data from air interface signals that have both multicast and unicast modes and the receiver is configured to not communicate return channel data via transmission of return channel data in the predetermined bandwidth.

The receiver may be configured to receive the data from a subset of the frequency bands within the predetermined frequency bandwidth and to ignore the other frequency bands which bear broadcast television signals.

According to another aspect, there is provided a method for receiving data, the method comprising:

receiving data in a first frequency band; receiving second data in a second frequency band, the second frequency band being a subset of the first frequency band; and selecting the frequency at which the second data is to be received from within the second frequency band in accordance with information representing the physical geographical location of the receiving device.

The method may further comprise: storing a database comprising a plurality of time segments in association with each of a plurality of second frequency bands, and the method comprises selecting the frequency of operation of the second receiver during one of the plurality of time segments.

The method may further comprise displaying to a user an electronic program guide created using the stored plurality of time segments and second frequency bands; and in response to a user input, the method comprises selecting the frequency of operation of the second receiver during a user selected one of the plurality of time segments.

The method may comprise receiving positioning information identifying the physical geographical location of the receiving device using either the Global Positioning System, wireless network information or user input physical location information.

The first data may contain information associating the frequency of operation of the second receiver with said physical geographical location of the receiving device.

The method may comprise connecting to a network and receiving the database over the network.

The method may comprise waking from a stand-by mode and receiving the second data during the selected time segment.

The method may comprise waking from a stand-by mode to receive the database either at a predetermined time or in response to a wake-up signal received in the first frequency band.

The database may be provided over social media in a predetermined format.

The method may comprise receiving television signals in the first frequency band according to a digital video broadcast protocol and the database is provided within broadcast Service Information within the television signals.

The method may comprise transferring to an external device the second data.

The received second data may be encrypted and the method may further comprise decrypting the encrypted second data using a decryption key.

The decryption key may be provided in accordance with a user input passcode or in accordance with a conditional access card.

According to another aspect, there is provided a method comprising receiving and recovering data from signals delivered in different frequency bands across a predetermined frequency bandwidth; receiving delivery information indicating the frequency bands in which the data is delivered, the delivery information further indicating timing information identifying the time at which the data is to be delivered and protocol information indicating the protocol used to deliver the data; and recovering the data from the frequency band indicated by the delivery information in accordance with the timing information and the protocol information.

The method may comprise receiving usage information, wherein the usage information indicates routing information identifying whether the data is to be stored, displayed to the user, delivered to a device external to the receiving device or whether the data is subject to content protection.

The method may comprise receiving and recovering data from air interface signals that have both multicast and unicast modes and the receiver is configured to not communicate return channel data via transmission of return channel data in the predetermined bandwidth.

The method may comprise receiving the data from a subset of the frequency bands within the predetermined frequency bandwidth and to ignore the other frequency bands which bear broadcast television signals.

According to another aspect, there is provided a computer program comprising computer readable instructions which, when loaded onto a computer configure the computer to perform a method according to any one of the above.

A storage medium configured to store the computer program therein or thereon is also provided.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6 shows a table stored in either a server in the system of FIG. 5 or the memory of the television set of FIG. 4;

DESCRIPTION OF THE EMBODIMENTS

Figure 1:
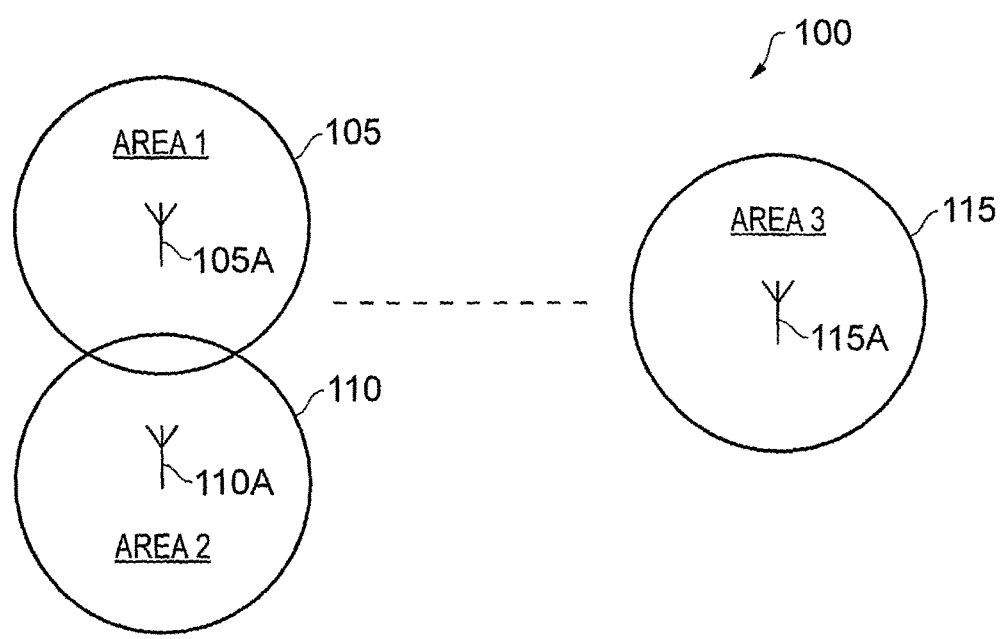
FIG. 1 shows a plan view of a broadcast region.

Referring now to the drawings, wherein like reference numerals designate identical or corresponding parts throughout the several views.

Referring to FIG. 1, a broadcast region 100 is shown. The broadcast region 100 is composed of a plurality of areas 105, 110 and 115. In the example of FIG. 1, three areas are shown.

However, any number may exist as would be appreciated. Indeed, it is envisaged that there are several areas located between the first and third areas, although the first and second areas are adjacent one another. Each area is provided with a transmitter from which the transport streams for that area are broadcast. The broadcast region 100 has a first area 105 and a second area 110 adjacent one another. The first area 105 uses a first transmitter 105A to broadcast transport streams and the second area 110 uses a second transmitter 110A to broadcast transport streams. A third area 115 is also provided in the broadcast region 100. The third area uses a third transmitter 115A to broadcast transport streams. The third area is located a distance from both the first area 105 and the second area 110. In fact, the distance between the third area 115 and the first area 105 and the second area 110 is sufficiently large that the signal broadcast by the third transmitter 115A does not reach any reception devices located within the first area 105 or the second area 110.

Figure 2:
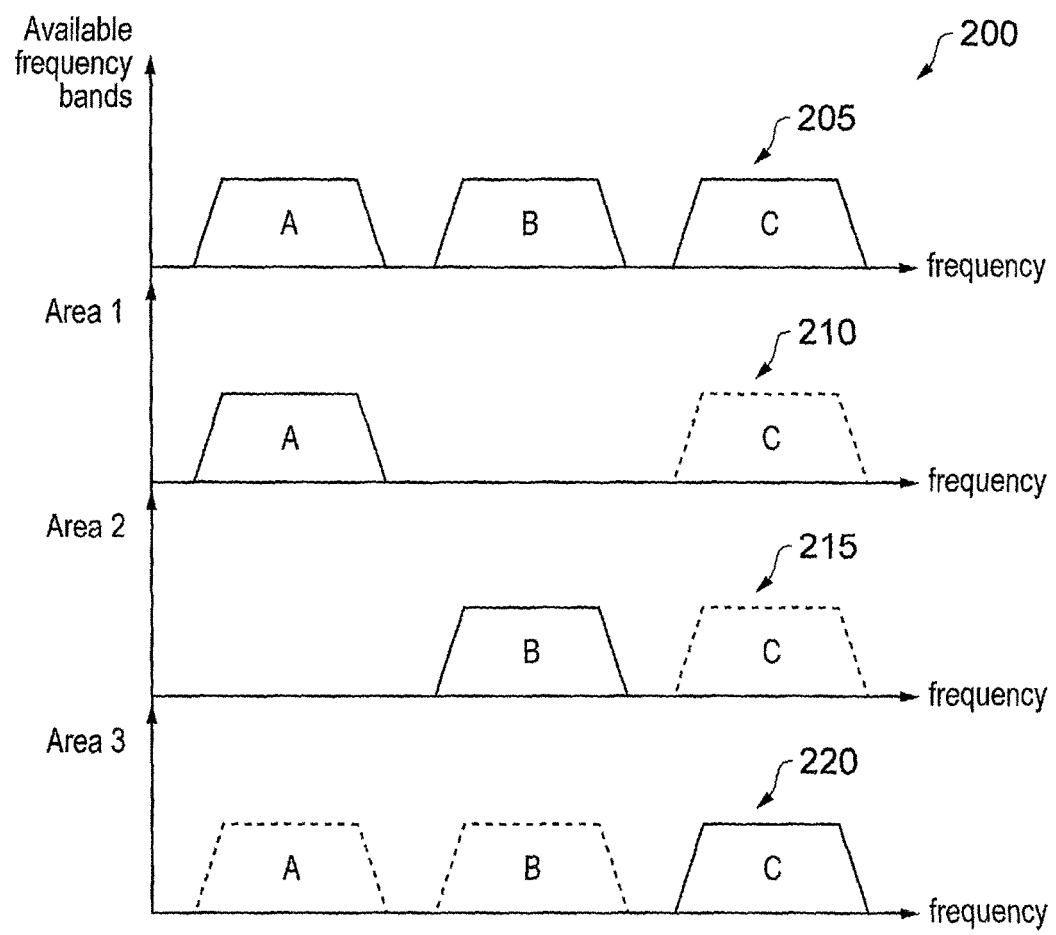
FIG. 2 shows a frequency chart describing the frequencies over which transport streams are transmitted in the broadcast region of FIG. 1.

Referring to FIG. 2 where a frequency chart 200 over which the first, second and third transmitters broadcast transport streams is shown.

In diagram 205, a first channel A, a second channel B and a third channel C is shown. The totality of the first, second and third channels are the entire UHF frequency band over which transport streams are broadcast. Of course, in reality, many more channels would be available, but the first, second and third channels are shown for the purposes of illustration only.

In diagram 210, the frequency channels used in the first area 105 are shown. Specifically, in the first area 105, the transport streams are broadcast on the first channel A. The third channel C is used as a White Space channel (as indicated by the dotted line in FIG. 2). The term "White Space" is a term of art and means frequencies allocated to a broadcast service but not used locally. In other words, "White Space" frequencies are frequency bands which are subsets of the frequencies allocated to a broadcast service.

In diagram 215, the frequency channels used in the second area 110 are shown. Specifically, in the second area 110, the transport streams are broadcast on the second channel B. The third channel C is used as a White Space channel (as indicated by the dotted line in FIG. 2).

The reason that the frequency channels used in the first area 105 and the second area 110 are different is because the first and second area are located adjacent one another. Therefore, if the same frequency channels were used, interference would exist as some devices in the first area 105 would receive transport streams broadcast by the second transmitter 110A.

As shown in diagram 220, the transmitter 115A broadcasts transport stream on the third channel C. However, in diagram 220 the first channel A and the second channel B are white space channels. In reality, the transmitter 115A could broadcast the transport streams on any of the first, second or third channel because, as noted above, the distance between the first and second areas and the third area is such that no channel transmitted by the first transmitter 105A and the second transmitter 110A reaches the third area 115. In some examples areas A, B and C are 7.61 MHz wide with a small guard band between them. The spectrum may be structured into such 8/7/6/5 MHz bands, or irregularly. Transmission may occur across multiple bands bonded together. In some examples areas A, B, and C are not adjacent one another (notwithstanding the guard band) in any one area, indeed having one or more white spaces between each channel.

Figure 3:
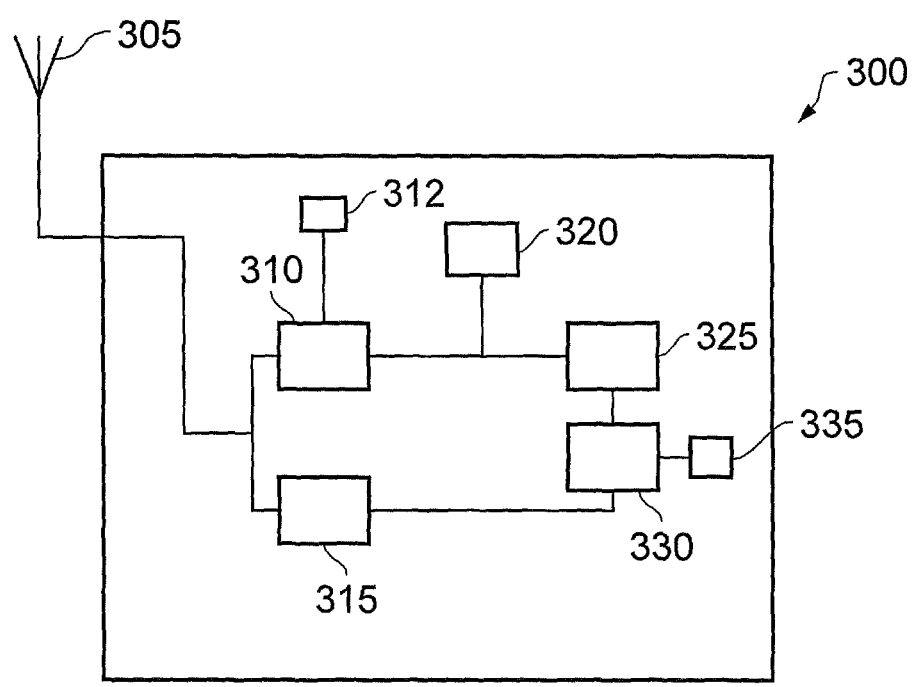
FIG. 3 shows a television set of embodiments of the disclosure.

FIG. 3 shows a television 300 according to embodiments. The television 300 is, when operational, connected to an antenna 305. The antenna 305 receives UHF signals broadcast by one of the transmitters 105A, 110A and 115A of FIG. 1. In other words, the physical geographical location of the antenna and thus the television, in use, is in one of the first area 105, the second area 110 or the third area 115. The antenna 305 is configured to receive the whole UHF band. So, in the example of FIG. 2, the antenna 305 is arranged to receive the first channel A, second channel B and the third channel C. One example of the antenna 305 may be a Yagi type antenna.

A television receiver 315 is connected to the antenna 305. The television receiver 315 may be a known television receiver which receives, demodulates and decodes any television signal. However, a brief summary of operation is provided. The television receiver 315 receives the UHF signals received by the antenna 305. In particular, the television receiver 315 is tuned to capture and process the UHF signals upon which a transport stream is carried. For example, in the case of FIG. 2, assuming the television 300 is located in area 1, the television receiver 315 is tuned to receive and process the first channel A.

After receipt and down-conversion of the channel, the television receiver 315 demodulates and decodes the transport stream. Although the television receiver 315 can demodulate the received signal broadcast according to any standard, in embodiments, the received signal will be modulated and coded according to the Digital Video Broadcast-Terrestrial (DVB-T) standard (either T or T2). The demodulated and decode transport stream is fed to a controller 330. DVB-T modulation and coding is given by way of example only, other examples may be ATSC or ARIB or the like.

Additionally connected to the antenna 305 is a white space receiver 310. The white space receiver 310 receives the UHF signals received by antenna 305. However, unlike the television receiver 315, the white space receiver 310 is tuned to receive the white space channel. In other words, the white space receiver 310 is tuned to receive a channel within the UHF set of channels (e.g. channels 21-60 in the United Kingdom) which is allocated nationally to broadcast services, but which are not used locally. So, if the television was located in area 1 of FIG. 1, the white space receiver 310 would tune to the third channel C. The white space receiver 310 demodulates and decodes the received signal from the white space channel. As will be explained, the white space channel may be used to transmit many different types of data and the standard by which the white space channel is modulated and coded will vary depending on the type of data. For example, the data may be audio/video data specific to the local area, or may be Internet Protocol data, WiFi data, Wimax data or any kind of data.

A geographical locating device 320 is connected to the white space receiver 310. The geographical locating device 320 outputs the physical geographical location of the television set 300. In other words, the geographical locating device 320 provides to the white space receiver 310, the physical geographical location of the television 300. It should be noted here that although in this example a geographical locating device 320 is described the disclosure is not so limited. For example, the location could be provided by the user entering his or her zip code (sometimes called the "post code")

Also connected to the white space receiver 310 is a white space memory 312. The white space memory 312 stores a database of geographical locations with corresponding white space channels for the geographical location. The white space memory 312 may be initially populated with the database at manufacture which may be updated once in-situ.

However, in order to save memory resource, the database may be retrieved from a server (not shown in FIG. 3) located remotely to the television 300 during set-up of the television 300 in a user's home. Specifically, during the set-up procedure, the geographical locating device 320 may determine the location of the television 300 and may interrogate a server maintained by a third party such as the manufacturer of the television 300 with the location of the television 300. In response to the interrogation, the server sends the database of white space channels to the television 300 for storage in the white space memory 312. This retrieval of the database from the server enables the television 300 to receive the most recent white space channel list.

It is also envisaged that the white space memory 312 may be populated with the database using the Service Information metadata located within the Digital Video Broadcast or other broadcast signal. The Service Information is included in the UHF signal received and decoded by the television receiver 315. In other words, the transmitter from which the television 300 receives the transport stream includes in the Service Information the database which will populate the white space memory 312. Two example advantages follow: Firstly, the television 300 has the most recent database and secondly the television 300 does not need to be connected to a server and is therefore a stand-alone device. This population may be done using a data carousel to ensure that the data transmitted on the Service Information meets the requirements of the relevant broadcast standard (which may be DVB or another suitable standard).

A network connection 325 is attached to the white space receiver 310 and the geographical locating device 320. The network connection 325 connects the television 300 to a network such as a local area network or the internet. The network connection 325 retrieves the database from the server, over the internet, if the white space memory 312 is populated using the server. Additionally, the network connection 325 is used to connect the television 300 to other networked devices. The white space receiver 310, as will be explained later, receives any kind of data such as audio and video data, or metadata or indeed any kind of data.

The controller 330 is connected to a controller memory 335. The controller memory 335 contains computer readable instructions which, when loaded onto the controller 330, configures the controller to perform method steps. The controller 330 is one example of a computer although any kind of computer or circuitry is envisaged. The controller memory 335 and the white space memory 312 may be any kind of memory such as solid state memory or optically read memory or the like.

The disclosure of FIG. 3 shows in general a receiving device for receiving data, the receiver comprising: a first receiver configured to receive first data in a first frequency band; a second receiver configured to receive second data in a second frequency band, the second frequency band being a subset of the first frequency band; whereby the second receiver is configured to select the frequency of operation from within the second frequency band in accordance with the physical geographical location of the receiving device.

Figure 4:
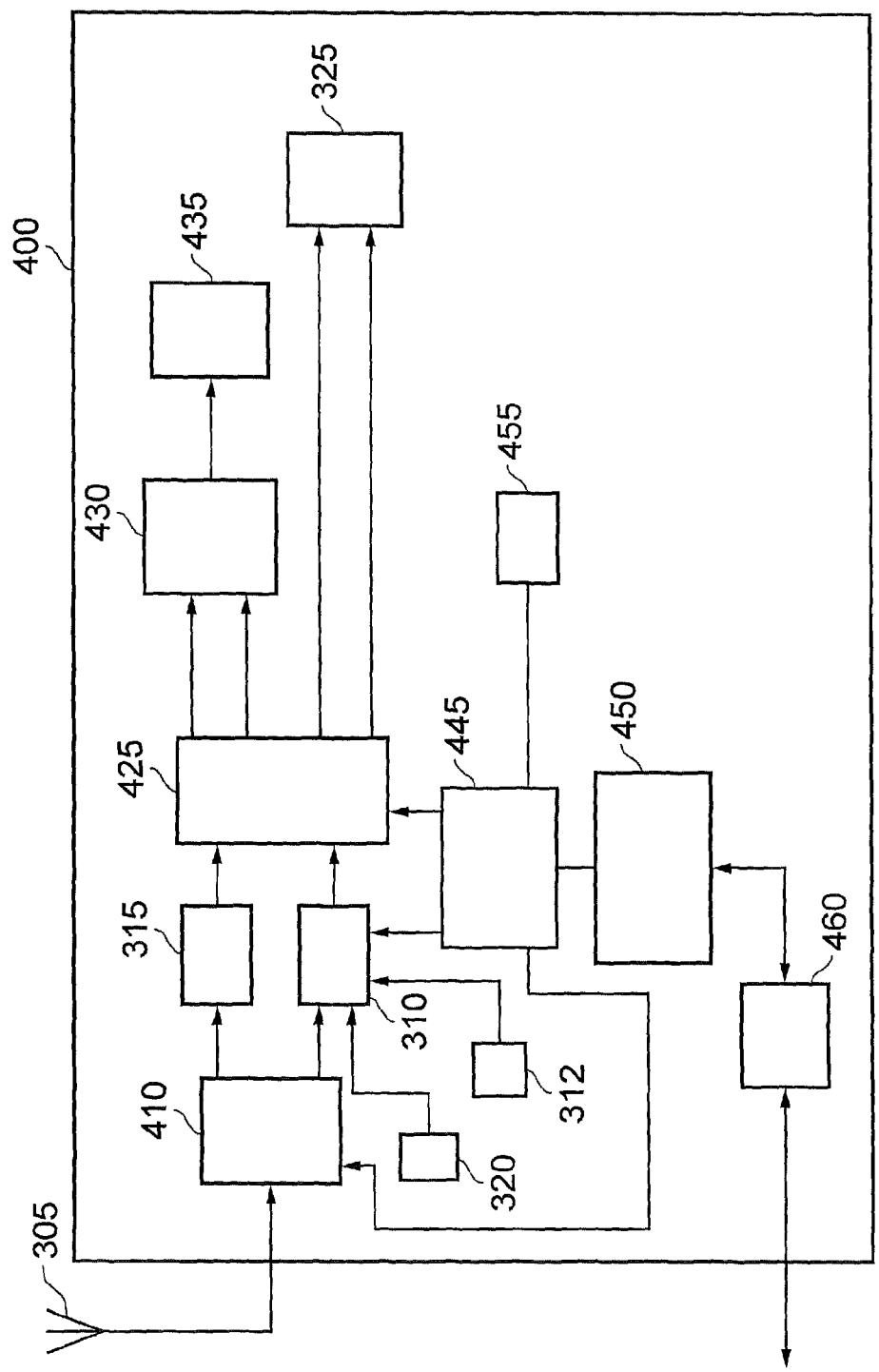
FIG. 4 shows another television set of embodiments of the disclosure.

Referring to FIG. 4, a second television 400 according to embodiments is shown. Like reference numerals refer to like features from FIG. 3. In particular, the antenna 305, white space receiver 310, the television receiver 315 and the network connection 325 described with reference to FIG. 3 are all provided in the television 400 of FIG. 4.

The antenna 305 of FIG. 4 is connected to a signal splitter 410. The signal splitter 410 is configured to receive the entire UHF frequency band. In other words, the signal splitter 410 receives all of channels received by the antenna 305. The signal splitter 410 directs the received signal to the white space receiver 310 and the television receiver 315. The signal splitter 410 may direct the entire received signal to each device (i.e. splitting the signal equally between the white space receiver 310 and the television receiver 315) or the signal splitter 410 may direct the entire received signal to either the white space receiver 310 or the television receiver 315 under the control of a controller device 445. In order to improve the signal strength received at either the television receiver 315 or the white space receiver 310, in this case, the signal splitter 410 directs the entire received signal to either the white space receiver 310 or the television receiver 315.

As noted above, the output from the signal splitter 410 is fed into both the white space receiver 310 and the television receiver 315. As in the case of FIG. 3, the white space receiver 310 of FIG. 4 is connected to a geographical locating device 320 and a white space memory 312. The television receiver 315, white space receiver 310, geographical locating device 320 and white space memory 312 operate in the manner described in FIG. 3. For brevity, the operation of these components will not be explained any further. However, it should be noted that the white space receiver 310 is controlled in FIG. 4 by the controller device 445. The interaction of the controller device 445 and the white space receiver 310 will become apparent later.

The output from both the white space receiver 310 and the television receiver 315 is provided to a switch 425. The operation of the switch 425 is controlled by the controller device 445. The output of the switch 425 is connected to a television decoder 430 and the network connection 325. The switch 425 controls which of the television decoder 430 and the network connection 325 receives the output of either the television receiver 315 or the white space receiver 310 as will be explained later.

The output of television decoder 430 is fed into a display 435 for viewing by a user of the television 400.

Also connected to the controller device 445 is a scheduler 450. The operation of the scheduler 450 will be explained in more detail later but the scheduler 450 identifies the time slot and the type of data on each of the white space channels. In other words, the scheduler 450 provides details of when certain local services such as local radio or television or data services are provided on each of the white space channels associated with the physical location of the television 400.

A schedule memory 455 is connected to the scheduler 450. The scheduler 450 is also connected to a network interface 460. The network interface 460 is connected to a network. This may be the same network as the network connection 325 or may be a different network such as a cellular network or Internet or the like.

Figure 9A:
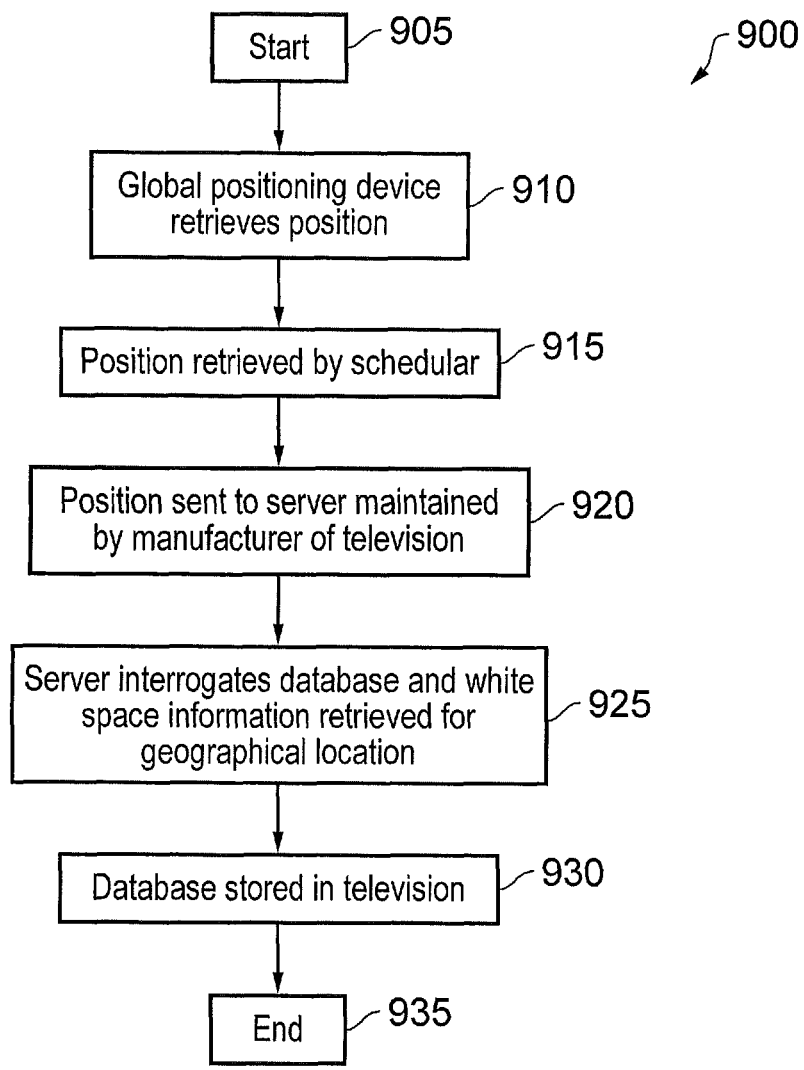
FIG. 9A and FIG. 9B show flowcharts explaining the operation of the television of FIG. 4.

The operation of the television of FIG. 4 is explained with reference to FIG. 9A and FIG. 9B. In FIG. 9A, the operation of the scheduler 450 is described with reference to a flow diagram 900.

When it is required to obtain the schedule of white space usage for the area in which the television 400 is located, the process starts at step 905. The controller device 445 determines when the schedule of white space is required. The controller device 445 may require the schedule once a day, once a week, only in response to a user command or at any other user defined, or manufacturer defined period of time.

The controller device 445 retrieves the physical geographical position of the television 400 at step 910. This may be retrieved using the zip code of the location of the television 400 (entered by the user), or using an automatic location system such as the Geographical locating device 320 which itself may use a Global Positioning System (GPS), or a WiFi location system or any kind of system that identifies the physical geographical location of the television 400. The position of the television may optionally be stored in the white space memory 312 or the controller memory 455. If the position of the television is stored, the retrieval of the physical location of the television 400 may be the stored position. This is because usually the television 400 will not move from a user's home and so will not need to update its position. Retrieving the location information from memory is quicker than asking a user to re-enter the zip code or to find the position of the television 400 automatically.

The physical position of the television 400 is passed to the scheduler 450 in step 915.

In step 920, the scheduler 450 passes the geographical location to a server (not shown in FIG. 4) via the network interface 460. In particular, the network interface 460 accesses the server over the Internet. The server interrogates the database stored thereon to retrieve the database entry for the geographical location. This is step 925.

The database provides the schedule of data that is transmitted over the white space for any location within the country of operation of the television 400 for a given time. Additionally, the database indicates the frequency upon which the data will be broadcast. Optionally, the database identifies the type of data that is broadcast over any white space in the identified location and a description of the data.

As previously stated the database schedule can be populated from data provided by server or other home networking or social media information. In addition it is also possible for the receiver to 'wake up' at a predetermined time to either receive either the white space schedule information table or simply cache any white space data that is present. The schedule and timing to look for such data may be agreed by the white space service provider and receiver manufacturer to ensure correct system synchronisation. Alternatively, the receiver may listen for a particular header in received data and 'wake up' in response to this header. In either case, this reduces power consumption in the receiver.

The database, in embodiments, is maintained by the manufacturer of the television 400. However, the present disclosure is in no way limited to this. For example, the server may be maintained by the regulator of broadcast services in the country of operation of the television 400 such as Ofcom in the United Kingdom or the Federal Communications Commission (FCC) in the United States of America. Indeed, any third party may maintain the database in the server.

An example of the database 600 for a given location is shown in FIG. 6. For the given location identified by the geographical location data received from the network interface 460, the frequency of the white space is provided in field 625. For each frequency, the time schedule for that frequency is provided in field 630. A description of the data to be provided over the scheduled time at the appropriate frequency is also given in field 635.

In the example of FIG. 6, for "channel 25" between 16:30 and 30 seconds and 18:43 and 30 seconds, local news 605 is broadcast. Between 18:43 and 31 seconds and 22:54 and 23 seconds on channel 25, data is provided via a data channel 610. This may be multicast data such as updates to firmware for the television 400 or other electronic devices. In this case, the multicast data will include an identifier which identifies the television or electronic device. The controller device 445 may forward the update data to any identified electronic device located on the network (via the network connection 325). In order to achieve this, the other electronic devices on the network must register with the controller device 445 prior to the start time of the data channel to provide a unique identifier, such as an IP address of the electronic device on the network. As would be appreciated, UHF channel numbers are illustrative; the data may include frequency ranges.

Other, usage, information may be also provided in the database. This information may include the protocol of the white space program. For example, if the white space program is encoded as Internet Protocol a(IP) packets, this may be noted in the database. Additionally, information relating to the routing or authorised functions applicable to the data may also be provided. For example, if the data received in the white space program may only be played back and not stored, this information is conveyed in the database. Similarly, if the white space program data may or may not be sent to a device external to the television 400, this is conveyed in the usage information. In other words, the usage information provides an indication of the protocol in which the white space program is encoded and optionally, the permitted uses of the data of the white space program.

For "channel 26" between 16:27 and 30 seconds and 19:00 exactly, a local weather report 615 will be broadcast. Between 19:00 and 01 second and 23:00 exactly, a local radio channel 620 is broadcast.

Returning to FIG. 9A, the database for the particular geographical location is returned to the television 400. The television 400 stores the database in memory. This memory may be the white space memory 312 or the controller device memory 455 or some other memory. In this case, the database is stored in the controller device memory 455. The process ends at step 935.

The database stored in the television 400 is used to generate an electronic program guide 700 (EPG) for display to the user. The EPG 700 visually describes the contents of the white space channels for the location. A column of channels 710 is shown. Besides each channel is a time grid 705. The content of the description column 635 of FIG. 6 is used to populate the time grid. This enables the user to quickly establish the content of the white space channel at any particular time.

The user navigates around the EPG 700 and selects an appropriate program in the white space. Specifically, in response to a user input the user navigates around the EPG 700 and the current location of the cursor is indicated by the appropriate program being highlighted.

Below the EPG 700 is a selection of control buttons. A first button 715 is pressed if the user wishes to watch the content of the highlighted white space program. A second button 720 sets a reminder so that the highlighted white space program is accessed at the appropriate time. A third button 725 records the highlighted white space program on a personal video recorder or the like. A fourth button 730 informs friends of the user of the television 400 that the user believes the highlighted program is of interest. The function of the fourth button 730 will be described later.

Figure 7:
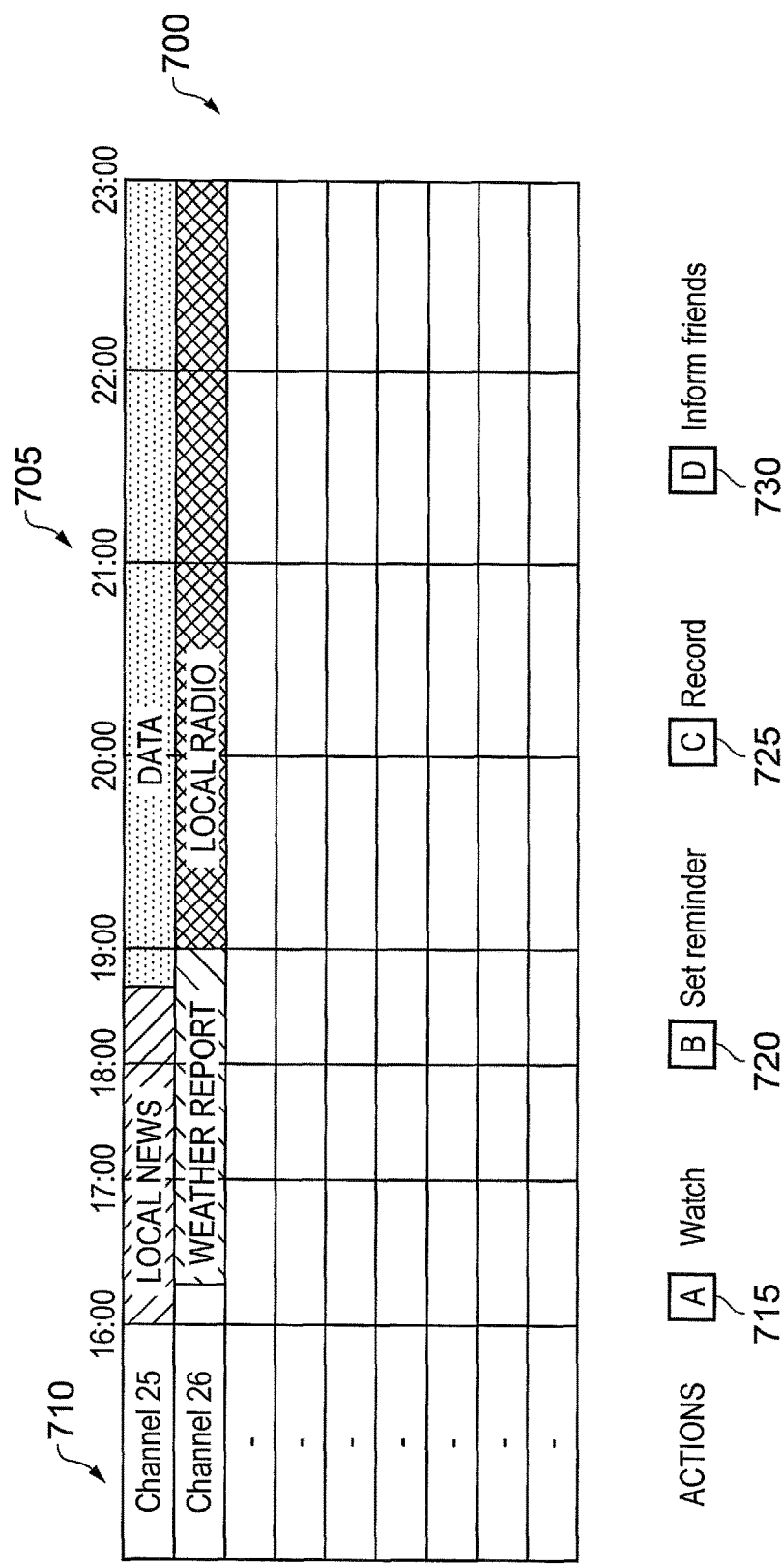
FIG. 7 shows an Electronic Programme Guide which is displayed to the user of the television set of FIG. 4.
Figure 9B:
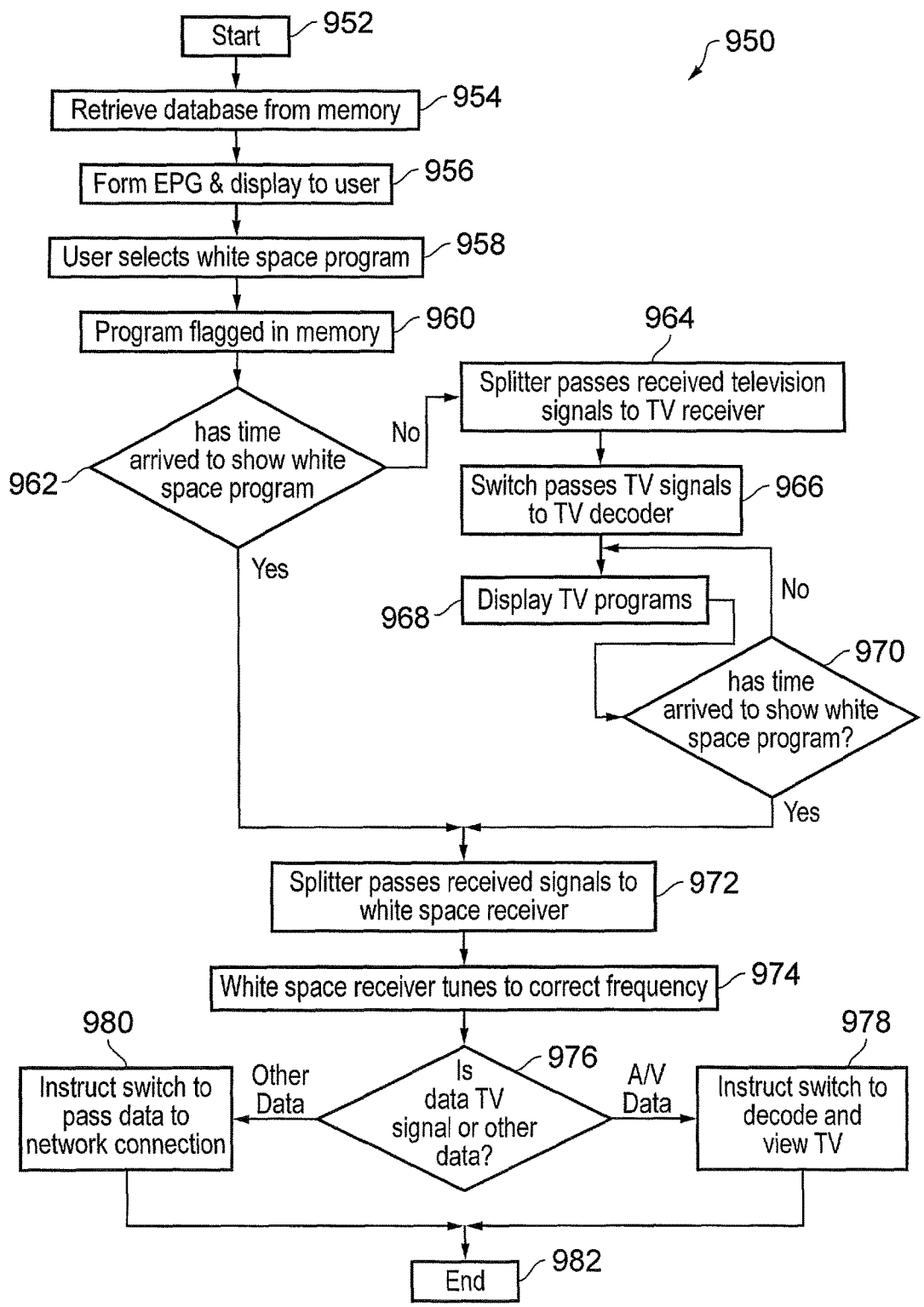

Referring to FIG. 9B, a flowchart 950 describing the operation of the television 400 when a user wishes to utilise the white space channels is shown. The flowchart 950 starts at step 952. The database of FIG. 6 which is stored in the television 400 is retrieved in step 954. The EPG of FIG. 7 is formed from the retrieved database and displayed to the user in step 956.

Using navigational controls or a touchscreen display, the user selects a white space channel program of interest from the displayed EPG in step 958. The stored database is updated to indicate that the user has selected the particular program. In embodiments, the selected program is flagged; the flag indicating whether the user wishes to record, watch, access the program or indeed inform the user's friends about the program. This is step 960.

The controller device 445 polls the memory in which the database is stored and compares the current time with the time at which any flagged programs commence (step 962). If the current time is not the same as that at which any flagged program commences, path "no" is followed.

In this case that the "no" path is followed, the splitter 410 under the control of the controller device 445, feeds the output from the antenna 305 to the television receiver 315. This is step 964. The switch 425, under the control of the controller device 445, feeds the output of the television receiver 315 to the television decoder 430 in step 966. The television decoder 430 decodes the television signal as is known and passes the decoded television signal to the display 435 for display in step 968. As would be appreciated, by following the "no" path, the user is watching a program broadcast conventionally on the non-white space channels.

Whilst the user is watching the program broadcast on the non-white space channels, the controller device 445 checks whether the current time is the same at which any flagged program commences. This is step 970. If the answer is "no", the no path is followed and the television 400 continues to display the program broadcast conventionally on the non-white space channels.

Alternatively, if the current time is the same at which any of the flagged program commences, the "yes" path is followed. It should be noted here that the following description applies irrespective of whether the "yes" path is followed at decision point 962 or decision point 970.

If the "yes" path is followed at either decision point 962 or decision point 970, the splitter 410 as controlled by the controller device 445, feeds the signals received by the antenna 305 to the white space receiver 310. This is step 972. The white space receiver 310 retrieves the frequency information from the database regarding the frequency of the program broadcast on the white space channel. This is step 974.

At this point, the type of program needs to be established. In other words, the television 400 needs to determine whether the program broadcast on the white space channel is a data program (for example, firmware updates, Internet data, or any other kind of non-audio or video data) or an audio/video program. The information enabling the receiver to determine the type of program may be carried as part of, or in the whole of a table of Service Information or in an Internet Protocol delivered data in a structured form such as an RSS feed or a Twitter feed.

By establishing the type of data, the decision point 976 can be resolved. Specifically, at decision point 976, the controller device 445 determines whether to follow the path "other data" or "audio/video data".

In the case that the controller device 445 determines that the received data is "other data", the controller device 445 instructs the switch 425 to pass the data to the network connection 325 in step 980. The network connection 325 routes the data to the appropriate device on the network. In order to correctly route the information, the controller device 425 identifies the type of program data received and includes the IP address of the device on the network to which the information should be routed. For example, the controller device 425 may identify that the firmware update is for a satellite receiver located on the network. The controller device 425 may store the IP address of each device on the network and, knowing that the firmware update is for the satellite receiver, will route the firmware update accordingly.

In the case that the controller device 445 determines that the received data is "audio/video data", the controller device 445 instructs the switch 425 to pass the data to the television decode 430. The television decoder 430 then decodes the audio/video data and passes the decoded audio/video data to the display for viewing by the user in step 978.

The process then ends at the end of the flagged program (step 982).

Figure 5:
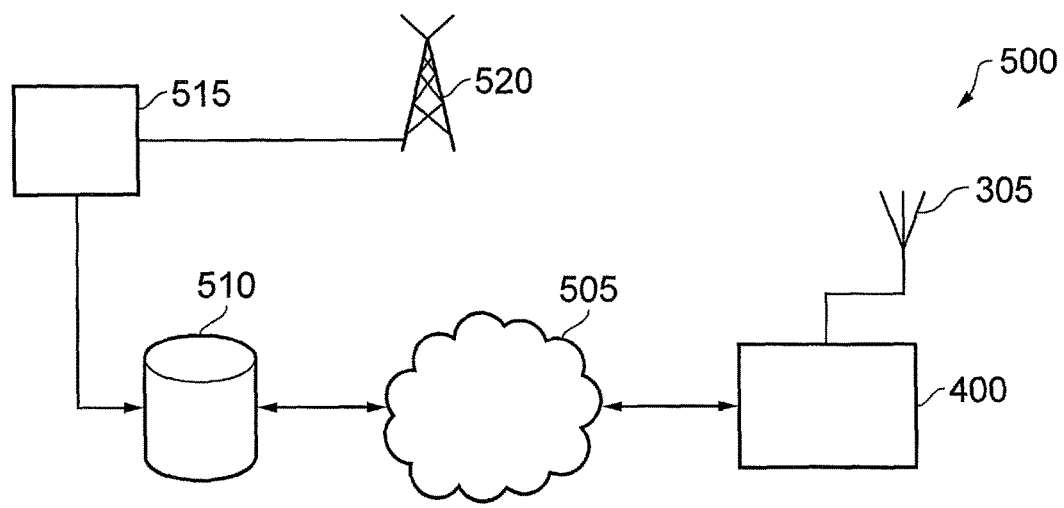
FIG. 5 shows a system including the television set of FIG. 4.

FIG. 5 explains a system 500 having a television 400 according to embodiments of the disclosure. The television 400 is connected to the antenna 305. The television 305 is also connected to a wide area network 505 using the network interface 460. The wide area network may be the Internet, a cellular network such as a 3G or LTE network or any kind of network. Also connected to the wide area network 505 is a server 510. Within the server 510 the database of white space programs is stored. As noted above the server 510 may be maintained by a manufacturer of the television 400 or by any third party such as a broadcaster or regulatory body. In the embodiment of FIG. 5, the server 510 is maintained by a broadcaster 515. The broadcaster 515 determines what content is supplied on the white space channels for a particular geographical location and updates the database stored on the server 510. Also, the broadcaster controls the content supplied to a broadcast tower 520 for transmission over the area local to the television 400.

The interaction of the television 400 with so-called "social media" will now be described with reference to FIG. 8.

Figure 8:
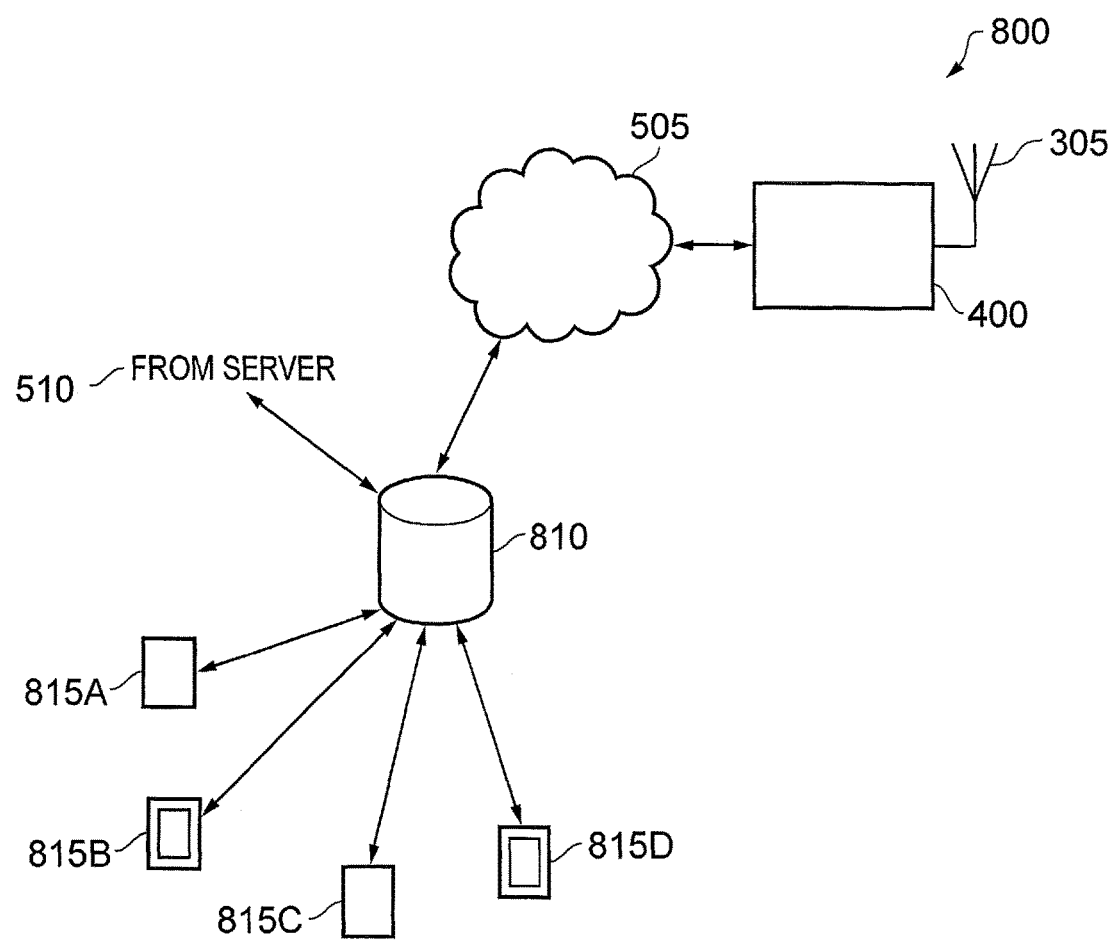
FIG. 8 shows a system including the television of FIG. 4 connected to other users via social media.

In FIG. 8, a system 800 is described. As is the case with FIG. 5, the television 400 is connected to the antenna 305 and the wide area network 505. However, in FIG. 8 a second server 810 is also connected to the network 505. The second server 810 is a social media server and is provided and maintained by a social media provider such as Facebook®, Twitter®, LinkedIn®, Tumblr® or the like.

Also connected to the second server 810 are users 815A-815D. These users may be connected to the second sever 810 using any number of devices such as a desktop computer 815A, a cell (mobile) phone 815B, a laptop computer 815C or a tablet 815D. Further, the server 510 is also connected to the second server 810. The broadcaster who maintains server 510 and users 815A-815D have an on-line relationship with the user of the television 400. In other words, the user of the television follows or is friends with or receives updates from the broadcaster and each of users 815A-815D.

Returning to the disclosure of FIG. 7, when the user presses the fourth button 730 to share the highlighted white space program any number of the users 815A-815D or indeed the broadcaster may receive a notification that the user of the television is either interested in the highlighted program or the highlighted program is being recommended to any of the users 815A-815D. It is also envisaged that when the user of the television selects a particular program, the details of the program are shared with the broadcaster. This enables the broadcaster to provide content over the white space that is relevant to consumers.

Social media may also be used to provide the database to the television 400 for storage thereon. For example, if the user of the television 400 "follows" the broadcaster on Twitter, the broadcaster can share with its "followers" the database. A scenario will now be described explaining this.

Typically, each broadcaster is a national broadcaster. However, most national broadcasters have non-networked television which is specific to local regions. For example, the British Broadcasting Corporation (BBC) has regional areas such as London, South East, North West and the like. Each of these regional areas broadcast television having content specific to that region, such as local news and weather. Each of these regions may have a separate Twitter name. For example BBC South East has the twitter account "#bbcsoutheast". If the television 400 is located in the BBC South East region, the user of the television 400 can follow "#bbcsoutheast" via the television 400. BBC South East will tweet to its followers the contents of the database instead of, or to supplement, the database being provided by other means.

In order to do this, the tweet must follow a specific pattern so that the television 400, when receiving the tweet, can extract the relevant information for storage in memory. One example of a tweet showing the content of the database of FIG. 6 would be cnl25*163030184330^Local News^184331225323^Data Channel^%cnl26*162730190000^Weather Report^190001230000^Local Radio^%

In this case, the term "cnl" means channel, the time is provided in the format HHMMSS and the text used to describe the content of the channel is separated by ^. Further to distinguish one channel from another a % character is used. The controller device 445 would identify these characters and, knowing the format of the tweet, would populate the database stored in the memory as required. Of course other examples of a format for providing the content of the database using Twitter or any other type of social media is envisaged.

It is envisaged that the controller device 445 may export the database, or the flagged entries in the database to external devices located on the network using the network connection 325. In other words, any device connected to a local network with the television 400 may receive the entire database or an extract of the database so that the external device is aware of the white space programs The user may access the database on that external device and may control that external device to select the white space program of interest. In this case, the external device will pass the user selection back to the television 400 so that the database can be updated.

It is envisaged that the data transmitted on the white space program may be encrypted. The television 400 may receive the decryption key separately to the white space program (for example via the Internet). Alternatively, the user may need to enter a passcode to access the white space program data. This passcode may be provided by the data provider in exchange for money. This allows conditional access data to be provided over the white space. Alternatively, the access may be provided using a so-called "smart card" inserted into the receiver. The smart card may be provided by the white space program provider for a fee or by the manufacturer of the television 400. The smart card may comply with the CI or CI+ standard. In order to decrypt the encrypted white space program, the television may be provided with a decrypting device (not shown) as would be appreciated.

Although the foregoing has been described with the controller device 445 actively comparing the current time with the commencement time of the white space program, the disclosure is not limited to this. For example, the television 400 could be woken from a standby state in response to a trigger provided either via the network interface 460 or via the DVB SI signal.

It is also envisaged that the database information may be provided at specific times. These specific times may be determined between the manufacturer of the television 400 and the white space program broadcaster. For example, the manufacturer and the white space program broadcaster may determine that the schedule information is only provided at 01:00, 05:00 and 23:30 hours and this will be provided via the DVB-SI information. Therefore, the controller device 445 will only expect the schedule information at these times. Alternatively, the schedule information will only be provided over the network interface at these times. Therefore, the network interface will remain in a stand-by mode and will only wake at these times. Further, the DVB-SI information may contain an indication to the controller device 445 to wake the network interface as the broadcaster is to send the database within the next 5 seconds or so. Again, the network interface will be in stand-by mode and will be woken. This reduces power consumption of the television device.

Although the foregoing has been described as being integrated into a television 400 the disclosure is not so limited. For example, the receiving device may be included in a set top box that is connected to the television 400. The connection may be wired using an HDMI cable, for example. Alternatively, the connection may be wireless using DLNA for example. In either case, the set-top box may pass the program data received over the white space to the television 400 or to any other electronic device to which it is connected using the wired or wireless connection.

Although the foregoing has been described with reference to the database being provided using only one mechanism such as DVB-SI or the network connection, the disclosure is not so limited. For example, the database may be retrieved using a combination of both DVB-SI and the network connection. So, the DVB-SI information may provide a network location such as a URI identifying the location of the database and the network connection can retrieve the database from the identified URI. Alternatively, or in addition, a portion of the database may be provided using DVB-SI with the remainder being provided using the network connection.

Although the foregoing has been described with reference to the white space data being broadcast, the disclosure is no way limited to this. For example, the white space data may be multicast or unicast. In other words, the same data, such as IP data, may be sent to numerous recipients in a multicast fashion. Alternatively, the white space data may be sent to a single recipient in a unicast method. In the unicast method, a packet of white space data may contain the IP address of the desired recipient which enables the desired recipient to identify that they are the desired recipient and the other devices may ignore such a packet of data sent as white space data.

In this case, the IP address may not be just the IP address of the television 400. The IP address may include the IP address of a device located on the local network connected using the network connection. In this case, the television 400 identifies that the IP address of a packet should be delivered to a device located on the local network. The controller device 445 instructs the network connection to deliver the packet to the device located on the local network. Also, it will be appreciated that the IP packet may be delivered using a point-to-point link between the receiving device and the external device. This point-to-point link may be a wired or wireless connection.

Although the foregoing has been described with reference to television, the disclosure is not so limited. Any type of white space scenario, for example with radio or the like is envisaged.

In the foregoing, it will be apparent to the skilled person that the receiving device (which may be embodied in a television or any kind of other electrical device), may receive multicast or unicast data over the white space without the need to provide a back-channel. In other words, the receiving device may receive any kind of data over the white space without a need to provide a back-channel to the sending device. This reduces not only the complexity of the device but also reduces the network usage of such as device.

In the foregoing, the receiving device consists of a first receiving device and a second, white space, receiving device. As the white space is a particular set of frequencies within the bandwidth of the first receiving device, in examples, the second receiving device does not capture and process the frequencies that are captured and processed by the first receiving device. This stops duplication of receiving devices capturing and processing the same frequency bands.

The controller device 445 is controlled using software. The software contains computer readable instructions which, when run on a computer, configures the computer to perform various method steps. This software is stored on a computer readable medium such as a solid state memory or optically read medium.

Obviously, numerous modifications and variations of the present disclosure are possible in light of the above teachings. It is therefore to be understood that within the scope of the appended claims, the invention may be practiced otherwise than as specifically described herein.

In so far as embodiments of the invention have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present invention.

The invention claimed is:

1. A receiving device for receiving data comprising:
   memory configured to store geographic location information that identifies a geographic location of the receiving device;
   a first receiver configured to receive and recover data from signals delivered in different frequency bands across a predetermined frequency bandwidth;
   a second receiver configured to receive and recover data from a subset of the frequency bands within the predetermined frequency bandwidth;
   a splitter configured to pass received data to the first receiver and the second receiver;
   an interface configured to receive delivery information, in a form of a database, provided by a specific user-followed entity over social media in a predetermined format, for storage in the memory of the receiving device and later retrieval from the memory for the receiver to receive and recover the data delivered in the subset of the frequency bands, the delivery information being specific for the geographic location of the receiving device and indicating the frequency bands in which the data is delivered, timing information identifying a time at which the data is to be delivered, and protocol information indicating a protocol used to deliver the data; and
   a controller configured to accept selection of data to be delivered in the subset of the frequency bands for recovery,
   wherein the controller is configured to, when a time at which the selected data is to be delivered arrives, control the splitter to pass the received data to the second receiver for recovery,
   wherein the controller is configured to, when the time at which the selected data is to be delivered has not arrived, control the splitter to pass the received data to the first receiver for recovery,
   wherein the controller is configured to, when the time at which the selected data is to be delivered arrives and the splitter has been controlled to pass the received data to the first receiver, control the splitter to pass the received data from the first receiver to the second receiver for recovery,
   wherein the second receiver is configured to recover the data from the frequency band indicated by the delivery information in accordance with the timing information, the protocol information, and the geographic location information retrieved from the memory,
   wherein the controller is configured to determine a type of the recovered data, and
   wherein the controller is configured to provide control such that the recovered data is processed locally at the receiving device when the recovered data is determined to be a first type of data and such that the recovered data is passed without processing locally at the receiving device to a network connection when the recovered data is determined to be a second type of data different from the first type.

2. The receiving device according to claim 1,
   wherein the interface is configured to receive usage information, and
   wherein the usage information indicates routing information identifying whether the received data is to be stored, displayed to the user, delivered to a device external to the receiving device, or whether the received data is subject to content protection.

3. The receiving device according to claim 1, wherein the second receiver is configured to receive and recover data from air interface signals that have both multicast and unicast modes, and not to communicate return channel data via transmission of return channel data in the predetermined frequency bandwidth.

4. The receiving device according to claim 3, wherein the second receiver is configured to ignore other frequency bands which bear broadcast television signals.

5. The receiving device according to claim 1, further comprising a geographical positioning device configured to receive positioning information identifying a physical geographical location of the receiving device using either Global Positioning System, wireless network information, or user input physical location information.

6. The receiving device according to claim 1, wherein the received data contains information associating the indicated frequency band with a physical geographical location of the receiving device.

7. The receiving device according to claim 1, wherein the interface is configured to connect to a network, and receive the delivery information over the network.

8. The receiving device according to claim 1, wherein the second receiver is configured to be in stand-by mode and to wake and receive the data during the identified time.

9. The receiving device according to claim 8, wherein the second receiver is configured to receive television signals according to a digital video broadcast protocol and delivery information provided within broadcast Service Information within the television signals.

10. The receiving device according to claim 8, wherein the interface is connectable to a telephony network or a local area network or a wide area network.

11. The receiving device according to claim 1, wherein the second receiver is configured to be in stand-by mode and to wake to receive the delivery information either at the identified time or in response to a wake-up signal received at the receiver.

12. The receiving device according to claim 1, further comprising:
   a device connector connectable to an external apparatus external to the receiving device; and
   data selection circuitry configured to select the device connector,
   wherein the device connector is configured to transfer to the external apparatus the second type of data.

13. The receiving device according to claim 1, further comprising a decrypting device configured to decrypt encrypted second type of data using a decryption key.

14. The receiving device according to claim 13, wherein the decryption key is provided in accordance with a user input passcode or in accordance with a conditional access card.

15. The receiving device according to claim 1, wherein the protocol information indicates that the protocol used to deliver data comprises internet protocol packets.

16. The receiving device according to claim 1, wherein the interface is an air interface.

17. The receiving device according to claim 16, wherein the air interface is configured to receive the delivery information provided over a unidirectional link.

18. The receiving device according to claim 1, wherein the delivery information is provided when subscribed to a data feed from a social media server.

19. The receiving device according to claim 1, wherein the database includes at least one record identifying a timing information for one frequency band of the plurality of frequency bands.

20. The receiving device according to claim 1, wherein the processing of the recovered data locally at the receiving device includes decoding the recovered data when the recovered data is determined to be the first type of data.

21. The receiving device according to claim 1, wherein the second type of data is a data program and the first type of data is an audio/video program.

22. The receiving device according to claim 1, wherein the passing the recovered data without processing locally at the receiving device to the network connection includes routing the recovered data to an external device, via the network connection, based on an IP address of the external device.

23. The receiving device according to claim 22, wherein the passing the recovered data to the external device includes determining the IP address of the external device from a data store, a selection of the external device to which to pass the recovered data being determined based on the protocol information for the recovered data.

24. A method for receiving data comprising:
   storing, in memory, geographic location information that identifies a geographic location of a location at which data is to be received;
   receiving and recovering data from signals delivered in different frequency bands across a predetermined frequency bandwidth at a first receiver;
   receiving and recovering data from a subset of the frequency bands within the predetermined frequency bandwidth at a second receiver;
   passing received data to the first receiver and the second receiver using a splitter;
   receiving delivery information, in a form of a database, provided by a specific user-followed entity over social media in a predetermined format, for storage in the memory and later retrieval from the memory for said receiving and recovering data delivered in the subset of the frequency bands, the delivery information being specific for the geographic location associated with said receiving and recovering and indicating the frequency bands in which the data is delivered, timing information identifying a time at which the data is to be delivered, and protocol information indicating a protocol used to deliver the data;
   accepting, using processing circuitry of the receiving device, selection of data to be delivered in the subset of the frequency bands for recovery;
   when a time at which the selected data is to be delivered arrives, controlling, using the processing circuitry, the splitter to pass the received data to the second receiver for recovery,
   when the time at which the selected data is to be delivered has not arrived, controlling, using the processing circuitry, the splitter to pass the received data to the first receiver for recovery,
   when the time at which the selected data is to be delivered arrives and the splitter has been controlled to pass the received data to the first receiver, controlling, using the processing circuitry, the splitter to pass the received data from the first receiver to the second receiver for recovery,
   recovering, using the second receiver, the data from the frequency band indicated by the delivery information in accordance with the timing information, the protocol information, and the geographic location information retrieved from the memory;
   determining, using the processing circuitry, a type of the recovered data; and
   providing, using the processing circuitry, control such that the recovered data is processed locally at the receiving device when the recovered data is determined to be a first type of data, and such that the recovered data is passed without processing locally at the receiving device to a network connection when the recovered data is determined to be a second type of data different from the first type.

25. The method according to claim 24, wherein the protocol information indicates that the protocol used to deliver the data comprises internet protocol packets.

26. A non-transitory computer readable medium including computer program instructions, which when executed by a computer causes the computer to perform the method of claim 25.

27. The method according to claim 24, wherein the database includes at least one record identifying a timing information for one frequency band of the plurality of frequency bands.

28. The method according to claim 24, wherein the processing of the recovered data locally at the receiving device includes decoding the recovered data when the recovered data is determined to be the first type of data.

29. The method according to claim 24, wherein the second type of data is a data program and the first type of data is an audio/video program.

30. The method according to claim 24, wherein the passing the recovered data without processing locally at the receiving device to the network connection includes routing the recovered data to an external device, via the network connection, based on an IP address of the external device.

31. The method according to claim 30, wherein the passing the recovered data to the external device includes determining the IP address of the external device from a data store, a selection of the external device to which to pass the recovered data being determined based on the protocol information for the recovered data.

\* \* \* \* \*